F. W. YOUNG.
BRIDGING BLOCK FOR DYNAMO ELECTRIC MACHINES.
APPLICATION FILED JULY 19, 1909.

941,182. Patented Nov. 23, 1909.

Witnesses:
Samuel W. Balch
Frank C. Cole

Inventor,
Frederick William Young,
by Thomas Ewing, Jr.
Attorney.

UNITED STATES PATENT OFFICE.

FREDERICK WILLIAM YOUNG, OF EAST ORANGE, NEW JERSEY, ASSIGNOR TO CROCKER-WHEELER COMPANY, OF AMPERE, NEW JERSEY, A CORPORATION OF NEW JERSEY.

BRIDGING-BLOCK FOR DYNAMO-ELECTRIC MACHINES.

941,182.  Specification of Letters Patent.  Patented Nov. 23, 1909.

Application filed July 19, 1909. Serial No. 508,347.

*To all whom it may concern:*

Be it known that I, FREDERICK WILLIAM YOUNG, a citizen of the United States of America, and a resident of East Orange, county of Essex, and State of New Jersey, have invented certain new and useful Improvements in Bridging-Blocks for Dynamo-Electric Machines, of which the following is a specification.

The object of this invention is to provide a slot closing bridging-block of inexpensive and durable construction which will have the requisite mechanical, magnetic and electrical properties.

Figure 1:
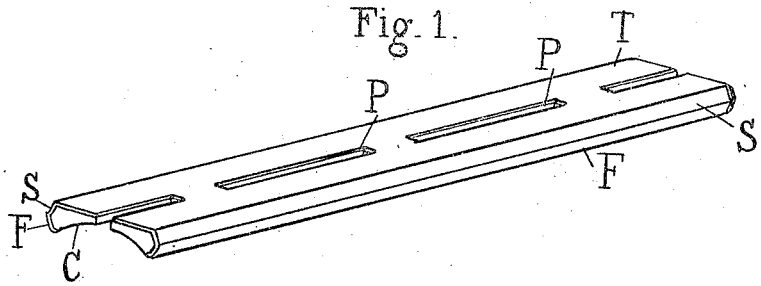
Figure 2:
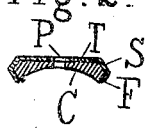
Figure 3:
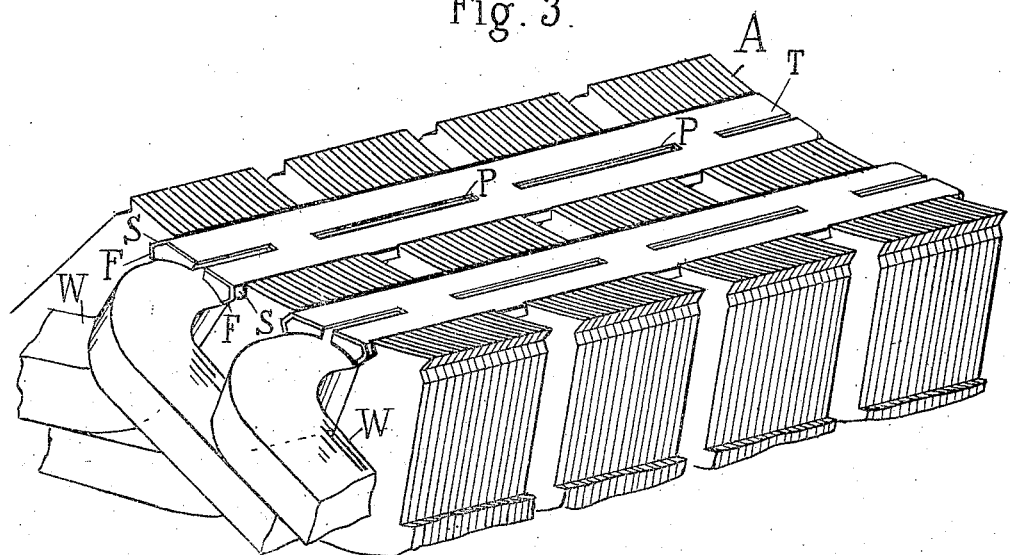

In the accompanying sheet of drawings which forms a part of this application—Figure 1 is a perspective of a bridging-block constructed in accordance with my invention. Fig. 2 is a transverse section through the bridging-block. Fig. 3 is a perspective of a portion of a stator in which one of the slots is closed by the bridging-block.

The invention is illustrated in connection with a laminated stator A constituting a slotted dynamo electric machine element with windings W W. The walls of the slots near their mouths are notched to receive the edges of the bridging-block. Each bridging-block consists of a sheet metal trough T, preferably of steel, having parallel sides S S inclined from each other to engage the notches in the slot walls. A plurality of slots or perforations P P are formed along the middle line. An iron core C is cast in the trough. This core is thinner along its middle line than in the portions which adjoin the sides of the trough and perforations are provided along the thinned middle portions which register with the perforations in the sheet metal trough thereby forming a thin web having a plurality of perforations. The edges of the sides of the trough F F are inturned to retain the iron core and thereby interlock the core and trough.

When in place in the slots of the dynamo-electric machine element the sheet metal overlies the cast iron and prevents it from falling out in case of breaking so that the connecting web may be thinner and more closely slotted or perforated than would be permissible if not so protected. The advantages of the high electric resistivity combined with the good magnetic conductivity of cast iron required in a bridging-block are thereby secured in a bridging-block which is of the desired form and which does not require machining to bring it to proper size.

What I claim as new, and desire to secure by Letters Patent of the United States, is—

1. As an article of manufacture, a slot-closing bridging-block consisting of a sheet metal trough and an iron core cast therein, substantially as described.

2. As an article of manufacture, a slot-closing bridging-block consisting of a sheet metal trough and an iron core cast therein, the trough and core being constructed to interlock, substantially as described.

3. As an article of manufacture, a slot-closing bridging-block consisting of a sheet metal trough and an iron core cast therein, the edges of the trough being inclined toward each other for interlocking said parts, substantially as described.

4. As an article of manufacture, a slot-closing bridging-block, consisting of a sheet metal trough and an iron core cast therein, the edges of the block being parallel and joined by a thin web, substantially as described.

5. As an article of manufacture, a slot-closing bridging-block, consisting of a sheet metal trough and an iron core cast therein, the edges of the block being parallel and joined by a thin slotted web, substantially as described.

6. As an article of manufacture, a slot-closing bridging-block, consisting of a sheet metal trough and an iron core cast therein, the edges of the block being parallel and joined by a thin web having a plurality of perforations, substantially as described.

7. The combination with a dynamo-electric machine element having coil-rotating slots, of slot-closing bridging-blocks, each of which consists of a sheet metal outwardly facing trough with sides conforming to the sides of the slots and an iron core cast therein, substantially as described.

Signed at East Orange, N. J., this 16th day of July, 1909.

FREDERICK WILLIAM YOUNG.

Witnesses:
  C. N. WHEELER,
  JOHN B. MILLIKEN.